United States Patent Office 3,342,735
Patented Sept. 19, 1967

3,342,735
ALKENYL SUCCINIC ANHYDRIDE-AMINE-$P_2S_5$ REACTION PRODUCT
David D. Reed, Lagrangeville, and Eugene Moroz, Yonkers, N.Y., and James M. Petersen, Erie, Pa., assignors to Texaco Inc., New York, N.Y., a corporation of Delaware
No Drawing. Filed Apr. 23, 1965, Ser. No. 450,529
8 Claims. (Cl. 252—46.7)

This invention relates to the novel reaction product of alkenyl succinic anhydride, an amine, and phosphorus pentasulfide. More specifically it relates to a mono-alkenyl succinic anhydride-amine-$P_2S_5$ complex product. The invention further pertains to lubricating oil compositions containing the alkenyl succinic anhydride-amine-$P_2S_5$ complex product.

In the interest of brevity, the mono-alkenyl succinic anhydride-amine-$P_2S_5$ reaction product of the invention will hereafter be known as the anhydride-amine-$P_2S_5$ complex.

The anhydride-amine-$P_2S_5$ complexes have demonstrated usefulness as detergent-dispersant additives in lubricating oils, particularly petroleum lubricating oils.

The anhydride-amine-$P_2S_5$ complexes are readily defined by their method of preparation. They cannot be truly characterized by an accurate chemical structural definition since the alkenyl and amino portions of the complex react with $P_2S_5$ in varying degrees to form multiple chemical structural relationships therewith. The complex product is in actuality a mixture of compounds wherein the alkenyl succinic anhydride, amine and $P_2S_5$ reactants, although present in each complex product molecule in one form or another, vary in chemical relationship with one another to the extent of producing a mixture of compounds.

The anhydride-amine-$P_2S_5$ complex product of the invention is prepared as follows:

Mono-alkenyl succinic anhydride of the general formula:

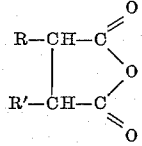

where R is a polyalkene derived radical of an average molecular weight between about 300 and 5000 and R' is a member selected from the group consisting of hydrogen and alkyl of from 1 to 6 carbon atoms, is first contacted with a first reactant selected from the group consisting of (a) $P_2S_5$ and (b) an amine selected from the group consisting of

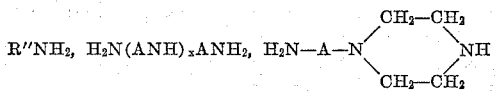

and

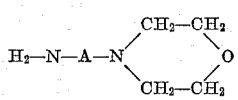

where R" is an alkyl of from 1 to 20 carbons, A is an alkylene radical of from 1 to 4 carbons and x is a whole integer from 0 to 5. The resultant reaction mixture is then secondly contacted with a second reactant being a member selected from the group consisting of said (a) and said (b), but being chosen from the group other than the one employed in the first contacting, thereby forming the anhydride-amine-$P_2S_5$ complex product of the invention. The first and second contactings are conducted at temperatures between about 30 and 250° C., advantageously in a mole ratio of anhydride to said first reactant and in a mole ratio of said anhydride to said second reactant of between about 1:0.10 and 1:2. The formed alkenyl succinic-amine-$P_2S_5$ complex of the formula is then advantageously purified by standard treatments such as filtration, washing, extraction, distillation and combinations thereof. Although the reaction time is not critical since some of the desired complex product will be produced no matter how short the reaction period, the reaction time for said first and second contacting is desirably between about 1 and 10 hours taking yield and commercial practicalities into consideration.

In the method of the invention volatilizable, inert liquid diluent may be employed under preferred conditions in order to facilitate contact of the reactants. Examples of contemplated inert liquid diluent are the saturated unsubstituted and substituted aliphatic and aromatic liquid hydrocarbon having boiling points between about 30 and 250° C. such as pentane, octane, xylene, toluene, ether and carbon tetrachloride. Also to facilitate the incorporation of the desired complex product in lubrication oil compositions by permitting the final complex product to be in the form of a lubricating oil solution as well as functioning as a reaction diluent inert lubricating oil may be employed in the method of the invention during any stage thereof, e.g. as a solvent for $P_2S_5$.

In order to prevent undesirable side reactions, the reactions are conducted advantageously in an inert atmosphere. This inert atmosphere can be provided by any of the inert gases such as nitrogen, helium and argon.

The alkenyl succinic anhydride initial reactant is prepared by the standard means such as by reacting maleic anhydride with a polyalkene of an average molecular weight of between about 300 and 5000. The polyalkene hydrocarbon is normally derived from an alkene of from 2 to 5 or more carbons such as ethylene, propylene, isopropylene, butene and isobutene. Specific examples of the polyalkenes are polyisobutene of about 1300 molecular weight (m.w.), polypropylene of about 2500 m.w., polyethylene of about 4000 m.w. and polybutene of about 1500 m.w. Specific examples of the contemplated monoalkenyl succinic anhydride reactants are those of the general formula:

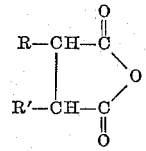

where R is a polyisobutene derived radical of an average molecular weight of about 1300 and R' is hydrogen; where R is polyethylene of about 800 m.w. and R' is hydrogen; where R is polyisopropylene of about 2500 m.w. and R' is hydrogen, where R is polybutene of about 3500 m.w. and R' is ethyl and where R is polypentylene of about 5000 m.w. and R' is methyl.

Specific examples of the amine reactants contemplated herein are ethylenediamine, triethylenetetraamine, tetraethylenepentamine, beta - aminoethyl piperazine, beta-aminopropyl piperazine, beta-aminobutyl morpholine, ethylamine, n-butylamine and dodecylamine.

In the lubricating oil compositions containing the anhydride-amine-$P_2S_5$ complexes of the invention, hydrocarbon mineral oil may be employed as the base material such as paraffin base, naphthene base or a mixed paraffin lubricating oil fractions are used in the formation of premium grade motor oils such as contemplated in this invention. The lubricating mineral oil base generally has been subjected to solvent refining to improve its lubricity and viscosity-temperature relationship as well as solvent dewaxing to remove waxy components and improve the pour of the oil. Broadly speaking, a mineral lubricating oil having an SUS viscosity at 100° F. between about 50 and 1000 may be used in the formulation of the improved lubricants of this invention. Usually the SUS viscosity range falls between 70 and 300 at 100° F.

Synthetic lubricating bases of the ester or ether type may also be used as lubricating base oils. High molecular weight, high boiling liquid aliphatic dicarboxylic acids and polyphenyl ethers possess excellent viscosity-temperature relationships and lubricating properties and are finding ever-increasing utilization in lubricating oils adapted for the high and low temperature lubrication. Esters and ethers of this type are used in the formulation of jet engine oils. Specific examples of synthetic ester lubricating oils are found in U.S. Patent No. 2,628,974 and 2,723,286. Specific examples of synthetic ether lubricating oils are described in "Lubrication," vol. 44, No. 11, page 150, published by Texaco Inc.

The anhydride-amine-$P_2S_5$ complexes of the invention are present in lubricating oils in concentration sufficient to impart detergent-dispersant properties thereto. In concentrates used in the formulation of finished lubricants the amount of the complex can be as high as 50%. In finished lubricants the concentration of the additive normally falls between 0.2 and 10 wt. percent with a concentration of between 1 and 5 wt. percent preferably employed.

The mineral lubricating oils containing the complexes of the invention usually contain other additives designed to impart other desirable properties thereto. For example, VI improvers such as polymethacrylates are normally included therein as are corrosion inhibitors and other detergents.

A widely used VI improver is polymethacrylate having the general formula:

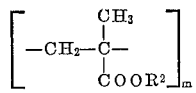

where $R^2$ is an aliphatic radical of from 1 to 20 carbons and $m$ is an integer between about 600 and 35,000.

Another commonly used supplementary lube oil additive is an alkaline earth metal alkyl phenolate, barium nonylphenolate, barium dodecylcresolate, and calcium dodecylphenolate are examples of such detergents. These products, which are well-known detergent additives, are usually present in the lubricating oil in a concentration between about 0.1 and 5 wt. percent.

The most commonly used supplementary lube oil inhibitor and anti-oxidant is a divalent metal alkyl dithiophosphate. Barium and zinc dialkyl dithiophosphates are are examples thereof. Metal dialkyl dithiophosphates usually present in the lubricant in a concentration between about 0.1 and 3 wt. percent.

The following examples further illustrate the invention but are not to be construed as limitations thereof:

EXAMPLE I

In 500 milliliters of xylene there was dissolved 232 grams of polyisobutene (1300 m.w.) succinic anhydride. To the resultant solution under an atmosphere of nitrogen, 24 grams of tetraethylene pentamine were added at room temperature. The resultant mixture was heated at a temperature of about 140° C. until the evolution of water by-product ceased which came to pass after 2.6 mls. of water were collected. The reaction mixture was then cooled, filtered through diatomaceous earth and stripped at 120° C. under 1 mm. Hg pressure. Analysis of the product found it to be polyisobutene (1300 m.w.) succinimide of n-tetraethylene pentamine. One hundred twenty-seven grams of the prepared succinimide intermediate were dissolved in 500 mls. of benzene and 2.8 grams of phosphorous pentasulfide were added to the resultant solution under an atmosphere of nitrogen at room temperature. The resultant reaction mixture was refluxed for about 4 hours at 150° C. and then cooled to room temperature, filtered through diatomaceous earth and stripped free of benzene and xylene at 120° C. under 1 mm. Hg. The product was identified as a complex reaction product of said succinimide and $P_2S_5$ having the following analysis: Neutralization No. (Neut. No.)=7.6, wt. percent phosphorous (P)=0.48 and wt. percent sulfur (S)=0.24. Infrared analysis indicated that part of the $P_2S_5$ had reacted with the polyisobutene portion of the complex and part with the amino group in the tetraethylene pentamine portion.

EXAMPLE II

To 500 milliliters of xylene there was added 232 grams of polyisobutene (1300 m.w.) succinic anhydride and 17 grams of N-aminoethyl piperazine. The reactants were heated at about 140° C. under a blanket of nitrogen until water by-product ceased to evolve. The reaction mixture was then cooled, filtered through diatomaceous earth and stripped free of xylene at atmospheric pressure. The product was identified as polyisobutene (1300 m.w.) succinimide of N-aminoethyl piperazine. This succinimide intermediate product in an amount of 108 grams together with 12 grams of $P_2S_5$ in 100 grams of mineral lube oil (100 SUS at 100° F.) were added to 300 milliliters of xylene and the mixture was refluxed at 150° C. under a nitrogen blanket for 5 hours. After cooling, the reaction product was filtered through diatomaceous earth and stripped free of xylene at atmospheric pressure. The product was identified as a mineral oil solution of a complex reaction product of said succinimide intermediate and $P_2S_5$. The analysis of the stripped residual reaction product found: wt. percent phosphorous=1.8 and wt. percent sulfur=2.6.

EXAMPLE III

To 600 milliliters of xylene there was added 232 grams mono-polyisobutene (1300 m.w.) succinic anhydride and 17 grams (0.125 mole) of N-aminoethyl morpholine. The reaction mixture was heated at 140° C. under a blanket of nitrogen until water ceased to evolve (5 mls.). The product was identified as the monopolyisobutene (1300 m.w.) succinimide of N-aminoethyl morpholine. One hundred twenty-four grams of the succinimide intermediate and 14 grams of $P_2S_5$ were combined and stirred under a blanket of nitrogen at 60–70° C. until the $P_2S_5$ dissolved. The reaction mixture was then filtered through diatomaceous earth. To the filtered solution 100 grams mineral lube oil (100 SUS at 100° F.) were added and the solution was stripped free of xylene at atmospheric pressure. The residual product was identified as a mineral oil solution of the complex reaction product of said succinimide and $P_2S_5$. The analysis of the stripped residual reaction product found: wt. percent phosphorus=1.7 and wt. percent sulfur=2.3.

EXAMPLE IV

In 300 milliliters of toluene there was dissolved 125 grams of polyisobutene (1300 m.w.) succinimide of N-butyl amine under a blanekt of nitrogen. To the resultant solution 14.8 grams of $P_2S_5$ were added and the resultant mixture was heated to 60° C. The heating continued until all the $P_2C_5$ dissolved (5½ hrs.). At the end of the dissolving period the reaction mixture was filtered and 50 grams of mineral lube oil (100 SUS at 100° F.) were added. The mixture was then cut back with ether, washed twice with water, separated, dried and stripped free of toulene at atmospheric pressure. The product was determined to be a mineral oil solution of the complex reaction product of said succinimide as said $P_2S_5$.

EXAMPLE V

To 317 grams of polyisobutene (1300 m.w.) succinic anhydride dissolved in 100 grams of mineral lubricating oil (100 SUS at 100° F.) maintained at 100° C. in a nitrogen atmosphere there was added 14 grams of $P_2S_5$ and upon completion of the $P_2S_5$ addition the temperature was raised to 150° C. and held there for 1 hour until the $P_2S_5$ dissolved. The resultant product in an amount of 431 grams was then added dropwise to a solution of 16.5 grams N-aminoethyl morpholine in 50 grams of mineral lubricating oil (100 SUS at 100° F.) at 60° C. and upon completion of the dropwise addition, the temperature was held 1 hour at 50° C. The final reaction product was analyzed and determined to be an oil solution of a polyisobutene (1300 m.w.) succinic anhydride-$P_2S_5$-aminoethyl morpholine complex product having a Neut. No.=15.16, wt. percent P=0.81, wt. percent S=1.85, wt. percent N=0.66 and a Saponification No. (Sap. No.) of 32.5.

EXAMPLE VI

To 633 grams of polyisobutene (1300 m.w.) succinic anhydride heated to 100° C. there was added under a blanket of nitrogen 28 grams of $P_2S_5$. The temperature was then raised to 150° C. and held 2 hours until all the $P_2S_5$ dissolved. To the resultant solution 200 grams of mineral lubricating oil (100 SUS at 100° F.) were added. To 856 grams of the resultant mineral lubricating oil solution there was added dropwise at 60° C. a solution consisting of 47 grams tetraethylene pentamine in 100 grams mineral lubricating oil (100 SUS 26 100° F.) After completion of the addition, the temperature was maintained 1 hour at 50° C. The final reaction product was identified as a mineral oil solution of a polyisobutene (1300 m.w.) succinic anhydride-$P_2S_5$-tetraethylene pentamine complex having a Neut. No. of 7.03, wt. percent P=0.81, wt. percent S=1.7, wt. percent N=1.6 and a Saponification No. (Sap. No.)=32.5.

EXAMPLE VII

To 317 grams of polyisobutylene (1300 m.w.) succinic anhydride maintained at 100° C. there was added under a blanket of nitrogen 14 grams of $P_2S_5$ and the temperature of the resultant mixture was raised to 150° C. and held 1 hour until the $P_2S_5$ dissolved. The resultant solution was then added dropwise below 60° C. to 16.1 grams of N-aminoethyl piperazine and upon completion of the addition the temperature was maintained 1 hour at 50° C. The product was analyzed and determined to be a complex reaction product of polyisobutene (1300 m.w.) succinic anhydride-$P_2S_5$-N-aminoethyl piperazine having a Neut. No.=14.98, wt. percent P=0.77, wt. percent S=1.5, wt. percent N=1.0 and Sap. No.=32.5.

EXAMPLE VIII

This example illustrates the use and effectiveness of the derivatives of the invention as detergent-dispersant additives in mineral oils.

The test employed was a simulated engine test to measure the sludge dispersant power of the test oil. In the sludge test, the test oil, a dispersion of finely divided titania in oil, and engine condensate are mixed with agitation at an elevated temperature. The solid particles simulate the lead salts found in used engine oil. A small sample of the test mixture is then centrifuged and a demerit rating is given corresponding to the loss or lack of dispersance as judged by the amount of solids separating to the bottom and the clear oil remaining after centrifuging the text mixture.

A clear oil demerit rating of 0 signifies the ability of the test oil to maintain all the solids in a dispersed condition, i.e., with no clear oil after centrifuging. Increasing amounts of clear oil shows increasing loss of dispersance and higher demerit ratings.

To stress more severely and hence evaluate the dispersancy quality of the oil under examination, the sludge test consists of a number of cycles. Additional stress is provide by adding more titania and engine condensate to the original mixture then repeating the mixing and the centrifuging of a small portion of the mixture. Since no more test oil is added, an ever increasing severity is imposed by each cycle. A clear oil demerit rating of less than 10 shows the test oil still has dispersancy potential and should be continued through the next cycle. Oils with little dispersance usually show clearing of all the oil (e.g., 42 demerits) on the first cycle. Oils completing two cycles with less than 10 clear oil demerits per cycle are of high dispersancy level.

Correlation of results from the above described simulated engine test with the well known CLR Engine test result is shown on page 168 of Lubrication Magazine for December 1963, vol. 49, No. 11, published by Texaco Inc.

Eight lubricating oil compositions were tested. These lubricant compositions comprise Base Oil A, Base Oil B and six additional compositions comprising Base Oils A and B containing the polyisobutene (1300 m.w.) succinic anhydrideamine-$P_2S_5$ complex products of the invention and their oil solutions prepared in Examples I, II, III, V, VI and VII.

The compositions of Base Oils A and B are reported below in Table I:

TABLE I.—COMPOSITIONS OF BASE OILS

| Ingredients | Base Oil A, Wt. percent | Base Oil B, Wt. percent |
|---|---|---|
| Refined Paraffinic Distillate Oil (SUS Visc. 140 at 100° F.) | 93.74 | 91.45 |
| Barium $C_{12}$ alkylphenolate | | 1.86 |
| Zinc isopropyl 1,3-dimethylbutyl dithiophosphate | 0.86 | 0.85 |
| $CO_2$ neutralized sulfurized basic barium sulfonate | | 0.68 |
| Mineral oil concentrate containing 25 wt. percent of a copolymer of mixed methacrylate esters in which the alkyl group ranges from butyl to octadecyl | 5.40 | 5.16 |
| Dimethylsilicone anti-foam concentrate, p.p.m | 150 | 150 |

The test data and results from 1 to 6 test cycles are reported below in Table II:

TABLE II.—SLUDGE TEST DATA

| Composition | Oil Clearing Demerits- after Cycle | | | | | |
|---|---|---|---|---|---|---|
| | 1 | 2 | 3 | 4 | 5 | 6 |
| Base Oil A | 42 | | | | | |
| Base Oil B | 40 | | | | | |
| Base Oil A plus 2.5 wt. percent Ex. I | 0 | 3 | 7 | 37 | | |
| Base Oil A plus 9.1 wt. percent Ex. II | 3 | 3 | 5 | 7 | 18 | 29 |
| Base Oil A plus 7.1 wt. percent Ex. III | 0 | 0 | 0 | 3 | 12 | 28 |
| Base Oil B plus 4.75 wt. percent Ex. V | 0 | 2 | 22 | 31 | | |
| Base Oil B plus 4.75 wt. percent Ex. VI | 0 | 0 | 18 | 30 | | |
| Base Oil B plus 4.75 wt. percent Ex. VII | 0 | 5 | 26 | 32 | | |

EXAMPLE IX

This example further illustrates the detergent-dispersant properties of the alkenyl succinic anhydride-amine-$P_2S_5$ reaction products of the invention.

In the well known CLR Sludge Engine test the detergent-dispersant properties of the alkenyl succinic anhydride-amine-$P_2S_5$ products of Examples I and VI were tested in the lube oil compositions as set forth in following Table III:

TABLE III.—COMPOSITION OF OIL

| Ingredients | Oil C | Oil D |
|---|---|---|
| Mineral Oil (~125 SUS at 100° F.) | 40.40 | |
| Mineral Oil (~140 SUS at 100° F.) | | 86.92 |
| Mineral Oil (~340 SUS at 100° F.) | 52.00 | |
| Example I Product | 2.50 | |
| Example VI Product | | 4.75 |
| Barium $C_{12}$ alkylphenolate | 1.15 | 1.81 |
| Zinc isopropyl 1,3-dimethylbutyl dithiophosphate | 0.56 | 0.85 |
| $CO_2$ neutralized sulfurized basic barium sulfonate | 0.96 | 0.67 |
| Zinc diamyl dithiocarbonate (1:1 lube oil solution) | 0.22 | |
| Mineral Oil concentrate containing 25 wt. percent of a copolymer of mixed methacrylate esters in which the alkyl group ranges from butyl to octadecyl | 2.21 | 5.00 |
| Dimethylsilicone anti-foam concentrate, p.p.m | 150 | 150 |

The CLR Sludge Engine test results for the above formulations are as follows:

TABLE IV.—CLR SLUDGE ENGINE TEST RATING*

| Test time, Hours: | Oil C | Oil D |
|---|---|---|
| 70 | 9.7 | 9.4 |
| 84 | 9.3 | 8.6 |
| 110 | 9.2 | 8.0 |
| 126 | | 7.4 |
| 134 | 7.6 | |

*Sludge free oil rating=10.

A comparative lubricating oil composition was subjected to the CLR Sludge Engine test. This comparative lube oil composition did not contain the alkenyl succinic anhydride-amine-$P_2S_5$ reaction products of the invention. After 36 hours in the CLR Sludge Engine test the comparative composition only had a merit rating of 6.

If desired, the complex alkenyl succinic anhydride-amine-$P_2S_5$ complex products of the invention may have their detergent-dispersant properties enhanced by further treatment. Such treatment may take the form of (1) subjecting the complex product to hydrolysis with optional removal of the resultant formed inorganic phosphorus acid products, (2) alkoxylation, e.g., with ethylene oxide or propylene oxide and (3) combination of the (1) and (2) treatments.

We claim:

1. An alkenyl succinic anhydride-amine-$P_2S_5$ complex reaction product produced by the method comprising first contacting an alkenyl succinic anhydride of the formula:

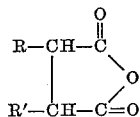

where R is a polyalkene derived radical of an average molecular weight between about 300 and 5000 and R' is a member selected from the group consisting of hydrogen and alkyl of from 1 to 6 carbons with a first reactant selected from the group consisting of (a) $P_2S_5$ and (b) an amine of the formula

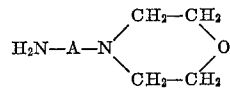

where A is an alkylene radical of from 1 to 4 carbons at a temperature between about 30 and 250° C. in a mole ratio of said alkenyl succinic anhydride to said first reactant of between about 1:0.10 and 1:2, then secondly contacting the resultant reaction mixture with a second reactant selected from the group consisting of said (a) and said (b) and said second reactant being selected from the group other than the group employed as said first reactant, said second contacting conducted at a temperature of between about 30 and 250° C. in a mole ratio of said alkenyl succinic anhydride and to said second reactant of betweeen about 1:0.10 and 1:2.

2. A product in accordance with claim 1 wherein said contactings are conducted in an inert atmosphere.

3. An alkenyl succinic anhydride-amine-$P_2S_5$ complex reaction product in accordance with claim 2 wherein said succinic anhydride is polyisobutene (1300 m.w.) succinic anhydride and said amine is N-aminoethyl morpholine.

4. A product in accordance with claim 1 wherein said first reactant is said amine and said second reactant is said $P_2S_5$.

5. A product in accordance with claim 4 wherein said anhydride is polyisobutene (1300 m.w.) succinic anhydride, said amine is N-aminoethyl morpholine and said contactings are conducted in an inert atmosphere.

6. A lubricating oil composition comprising a major amount of lubricating oil and an effective detergent-dispersing amount of the alkenyl succinic anhydride-amine-$P_2S_5$ complex reaction product of claim 1.

7. A lubricating oil composition in accordance with claim 6 wherein said effective amount is between about 0.1 and 10 wt. percent.

8. A lubricating oil composition in accordance with claim 6 wherein said alkenyl succinic anhydride is polyisobutene (1300 m.w.) succinic anhydride and said amine is N-aminoethyl morpholine.

References Cited

UNITED STATES PATENTS

| | | | |
|---|---|---|---|
| 3,184,411 | 5/1965 | Lowe et al. | 252—46.7 |
| 3,185,646 | 5/1965 | Anderson et al. | 252—46.7 |
| 3,185,647 | 5/1965 | Anderson et al. | 252—46.7 |

DANIEL E. WYMAN, *Primary Examiner.*

L. G. XIARHOS, W. H. CANNON,
*Assistant Examiners.*